United States Patent
Sugimoto

(10) Patent No.: US 10,282,131 B2
(45) Date of Patent: May 7, 2019

(54) ELECTRONIC DEVICE AND APPLICATION CONTROL PROGRAM BOTH OF WHICH ARE SUITABLE FOR DATA BACKUP PROCESS AND THE LIKE

(71) Applicant: KYOCERA Document Solutions Inc., Osaka (JP)

(72) Inventor: Kensaku Sugimoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/821,993

(22) Filed: Nov. 24, 2017

(65) Prior Publication Data

US 2018/0143767 A1    May 24, 2018

(30) Foreign Application Priority Data

Nov. 24, 2016    (JP) ................................. 2016-227448

(51) Int. Cl.
*G06F 3/06* (2006.01)
*G06F 11/14* (2006.01)

(52) U.S. Cl.
CPC ............. *G06F 3/065* (2013.01); *G06F 3/067* (2013.01); *G06F 3/0619* (2013.01); *G06F 11/14* (2013.01)

(58) Field of Classification Search
None
See application file for complete search history.

(56) References Cited

U.S. PATENT DOCUMENTS

| | | | |
|---|---|---|---|
| 6,941,135 B2 * | 9/2005 | Minear ..................... | G06F 8/62 455/418 |
| 8,810,845 B2 * | 8/2014 | Yamada ............. | H04N 1/00326 358/1.13 |
| 2005/0102329 A1 * | 5/2005 | Jiang ................... | G06F 11/1451 |

FOREIGN PATENT DOCUMENTS

JP        2014-191508 A    10/2014

* cited by examiner

*Primary Examiner* — Michael Alsip
(74) *Attorney, Agent, or Firm* — Hawaii Patent Services; Nathaniel K. Fedde; Kenton N. Fedde

(57) ABSTRACT

Enablement of backup and restoration of specific data (SD) without creating a new firmware. An electronic device includes a system control, data-acquisition, and data-restoration sections. The system-control section downloads, from an application-providing-server, an application having an SD backup-procedure and a data-restoration-procedure of the SD based on the backup-procedure and the data restoration-procedure. A storage-section stores the downloaded application. The data-acquisition section executes the application to acquire the SD. The data-restoration section executes the application to restore the SD. The system control section causes, during the backup-procedure, transmit the SD acquired by the data-actuation-section to a backup-server and delete, thereafter, the application stored in the storage device. The system control section causes, during the data-restoration-procedure, to download the SD from the backup-server to use the downloaded SD, and to delete the application after the data-restoration section completes the restoration of the SD.

2 Claims, 8 Drawing Sheets

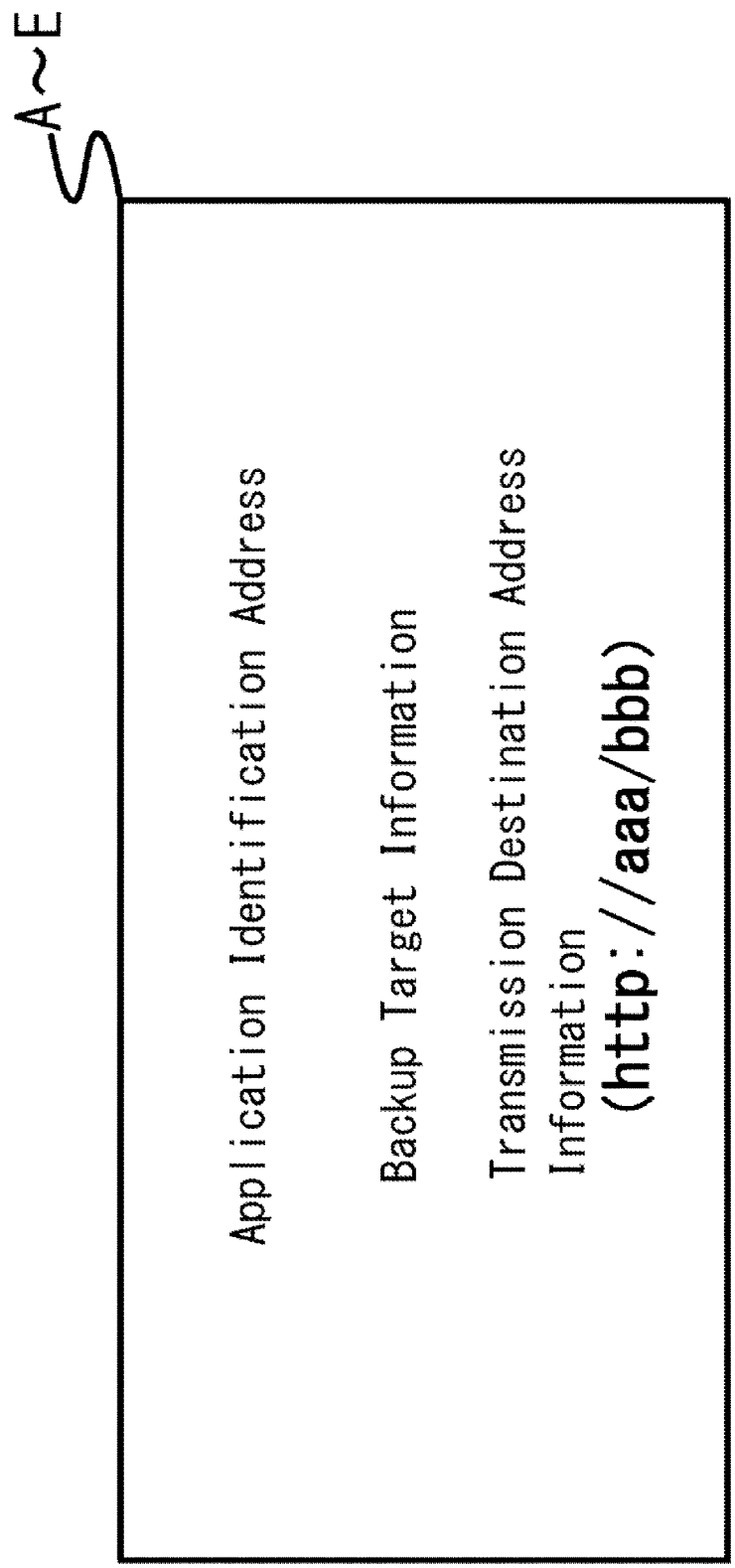

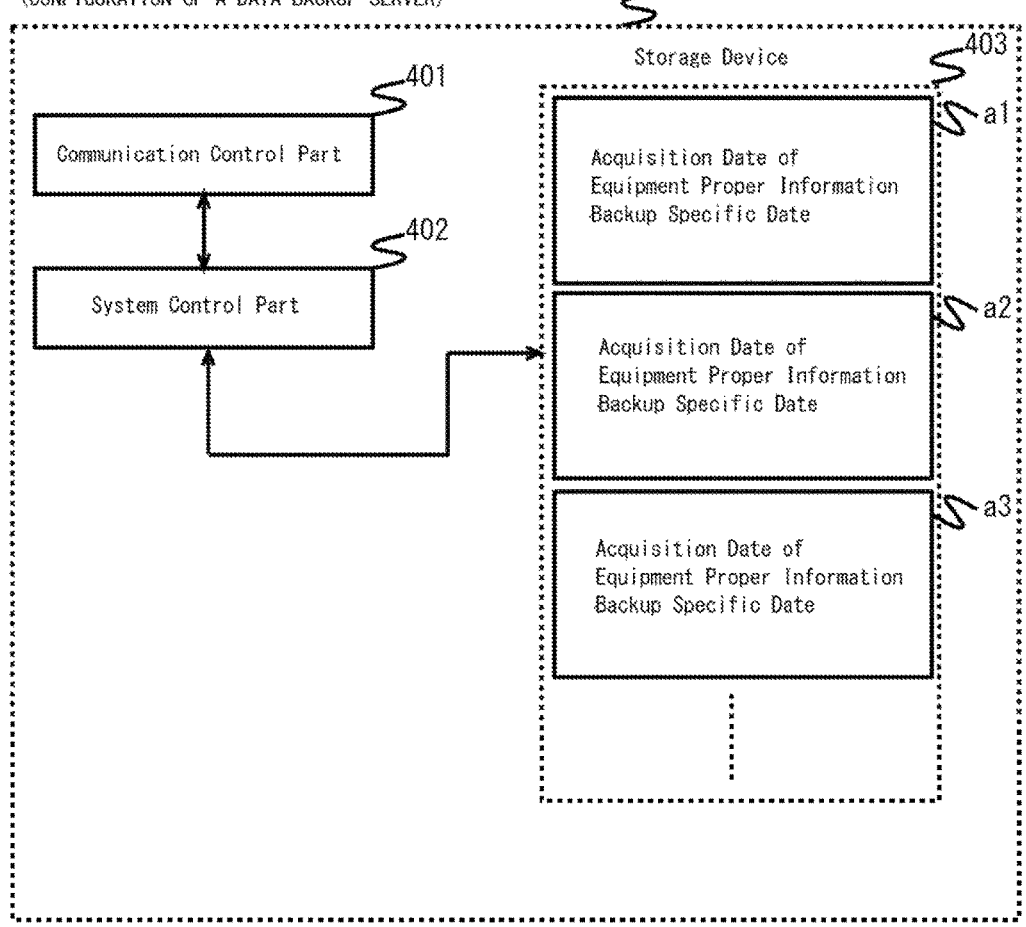

FIG.4A

117a (AN EXAMPLE OF SETTING CONTENTENTS OF BACKUP DATA)

(Setting 1)
Address Information of Acquisition Destination of Application
http://xxx/yyyy

(Setting 2)
Acquisition Timing of Application
Everyday 1 3 : 0 0

(Setting 3)
Applications to be acquired
A, D, E

(AN EXAMPLE OF SETTING CONTENTENTS OF DATA RESTORATION) ⏴117b (Setting 1)
Address Information of Acquisition Destination of Application
http://xxx/yyyy (Setting 2)
Acquisition Timing of Application
At the time of request by Administrator (Setting 3)
Applications to be acquired
A

FIG.4B

ELECTRONIC DEVICE AND APPLICATION CONTROL PROGRAM BOTH OF WHICH ARE SUITABLE FOR DATA BACKUP PROCESS AND THE LIKE

INCORPORATION BY REFERENCE

This application is based on and claims the benefit of priority from Japanese Patent Application No. 2016-227448 filed on Nov. 24, 2016 the contents of which are hereby incorporated by reference.

BACKGROUND

The present disclosure relates to an electronic device and application control program both of which are suitable for data backup process and the like For example, some image forming devices, each of which is in the form of an MFP, as a multifunction printer or the like, are equipped with printing function, copy function, fax function, data transmission/reception function via network, and other function. These functions are executed based on dedicated software, respectively, but it is anticipated that new functions will increase more and more in the years ahead. Firmware for operating hardware depending on each of the functions is updated, for the operation guarantee, to the latest version by a downloading thereof.

Incidentally, the image forming devices stores therein various information such as in-system setting information and document information, which requests to perform data backup on the assumption of a possible system error occurrence. However, the amount of data in the backup process is enormous, which results in that mounting a large-capacity storage device is necessary.

In such a case, if a typical example of the image forming device employs the status information transmission method, it is possible to understand that the image forming device is free from to mount a large-capacity storage device. More specifically, typical example of the image forming device includes an agent section that is configured to transmit status information to a remote maintenance server on the side of a maintenance service provider. The agent section acquires transmission schedule information of the status information from the remote maintenance server and operation schedule information of the image forming apparatus side, and determines a transmission timing of the status information based on both the transmission schedule information and the operation schedule information. Thereafter, when the transmission timing arrives, the agent section transmits the status information to the remote maintenance server.

SUMMARY

An electronic device according to the present disclosure includes a system control section, a data acquisition section, and a data restoration section. The system control section downloads, from an application providing server, an application having a backup procedure of specific data and a data restoration procedure of the specific data based on either one of the backup process and the data restoration process. The storage section stores the downloaded application. The data acquisition section executes the application to acquire the specific data. The data restoration section executes the application to restore the specific data. The system control section is caused to transmit the specific data acquired by the data acquisition section to a backup server during the backup procedure and to delete the application stored in the storage device after the transmission of the specific data. The system control section is caused to download the specific data from the backup server, during the data restoration procedure, to instruct the data restoration section to download the specific data for restoring the specific data, and to delete the application after the data restoration section completes the restoration of the specific data.

A non-transitory computer-readable recording medium according to the present disclosure stores an application control program that is executable by a computer. The application control program causes the computer to operate that include a system control section, a storage device, a data acquisition section, and a data restoration section in the following ways that include: causing the system control section to download, from an application providing server, an application having a backup procedure of specific data and a data procedure of the specific data based on either of the backup process and the data restoration process; causing the storage section that stores the downloaded application; causing the data acquisition section that executes the application to acquire the specific data; and causing the data restoration section that executes the application to restore the specific data, the system control section being caused, during the backup procedure, to transmit the specific data acquired by the data actuation section to a backup server and to delete the application stored in the storage device after the transmission of the specific data, causing the system control section, during the data restoration procedure, to download the specific data from the backup server, to instruct the data restoration section to use the downloaded specific data for restoring the specific data as of before the backup, and to delete the application after the data restoration section completes the restoration of the specific data.

BRIEF DESCRIPTION OF THE DRAWINGS

FIG. 2B illustrates a configuration of the cloud server shown in FIG. 1 by depicting contents of an application stored in the storage device shown in FIG. 2A.

FIG. 3 shows an outline configuration of a data backup server of FIG. 1;

FIG. 4A shows an example of data backup setting contents, as setting contents to be set on the MFP side in FIG. 1, which are included in application acquisition setting information managed by a backup data acquisition section;

FIG. 4B shows an example of setting contents, as the setting contents set on the MFP side in FIG. 1, which are included in the application acquisition setting information managed by a data restoring section;

DETAILED DESCRIPTION

Hereinafter, an embodiment of an electronic device according to the present disclosure will be described with reference to FIGS. 1 to 6. As an example of the electronic device in the following description, an MFP will be referred which is a combined peripheral device equipped with, for example, a printing function, a copying function, a FAX function, and a data transmitting/receiving function via a network.

Figure 1:
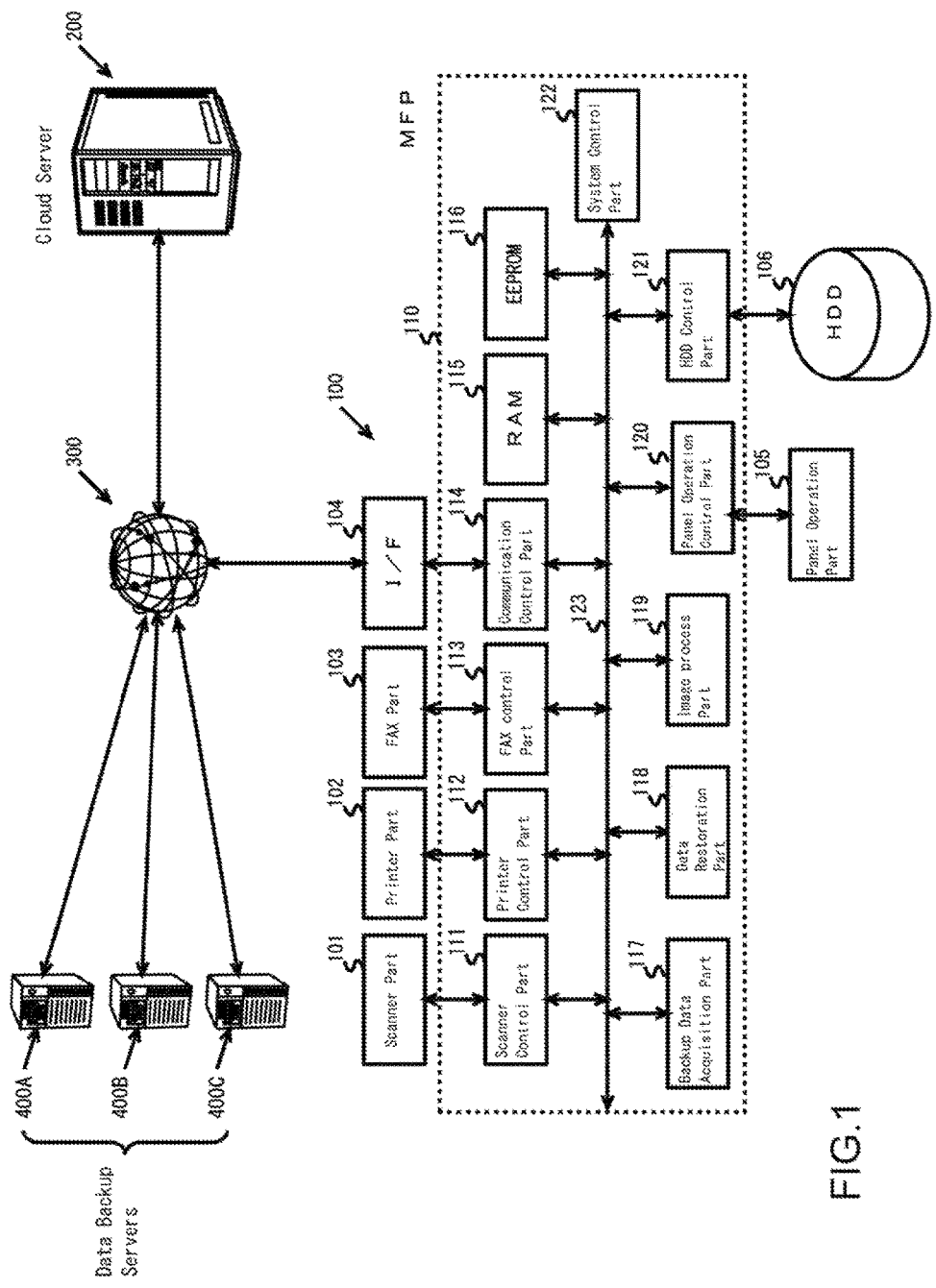
FIG. 1 shows an embodiment of an electronic device according to the present disclosure when the electronic device is in the form an MFP.

First of all, as shown in FIG. 1, an MFP 100 is connected to a cloud server 200 and data backup servers 400A to 400C via a network 300 such as the Internet. In FIG. 1, only one MFP 100 is shown, however a plurality of MFPs 100 may be provided. In addition, although FIG. 1 shows the case of one cloud server 200, a plurality of cloud servers 200 may be available. In addition, although FIG. 1 illustrates three data backup servers 400A to 400C, the number of data backup servers 400A to 400C may be reduced to two or less, or increased to four or more.

Figure 2A:
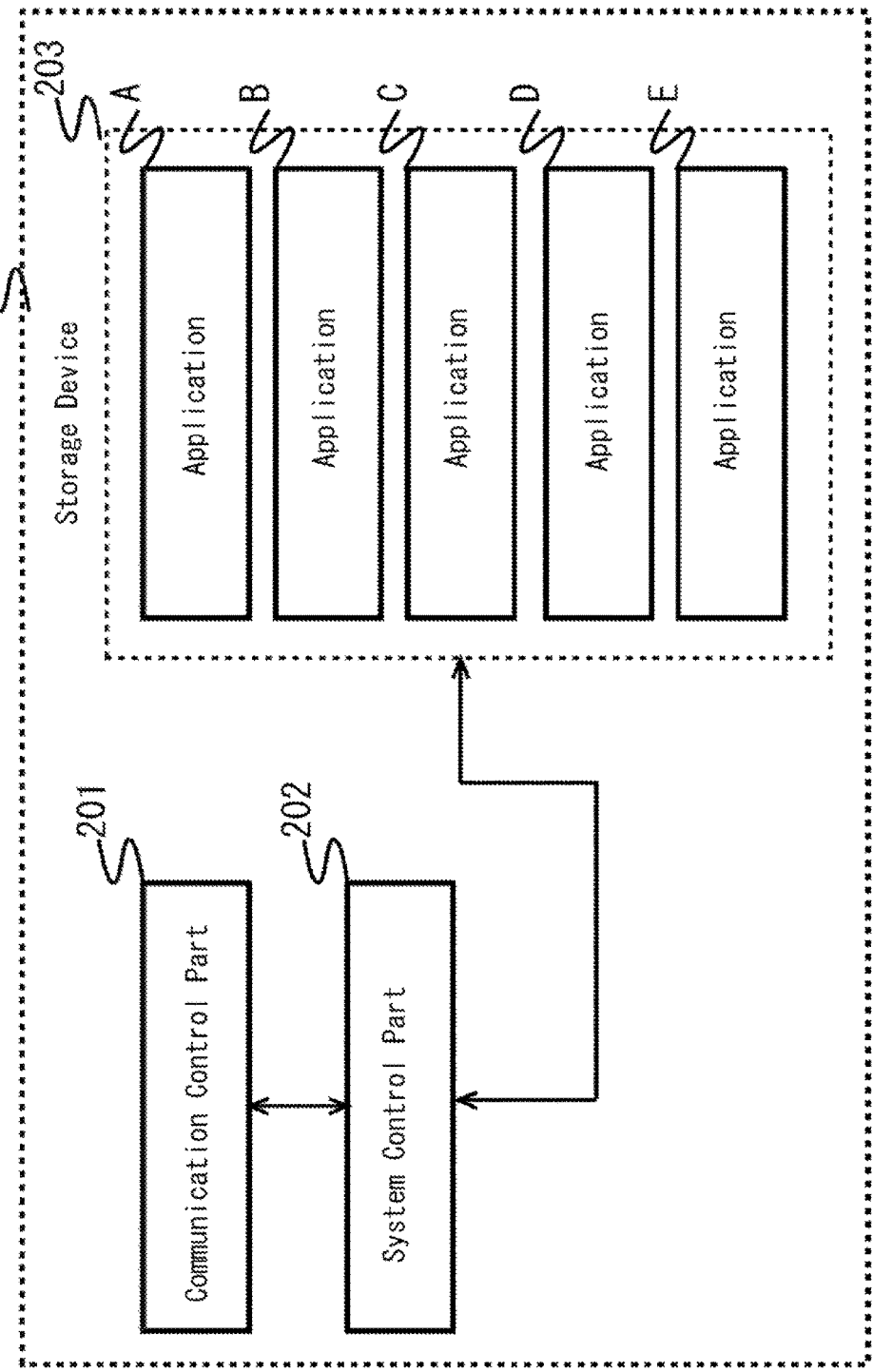
FIG. 2A illustrates a configuration of the cloud server shown in FIG. 1 by depicting an overview configuration of the cloud server.

Here, as shown in FIG. 2A, the cloud server 200 has a communication control section 201, a system control section 202, and a storage device 203. The storage device 203 stores various applications A to E for acquiring specific data (hereinafter which will be referred to as backup specific data) for backup on the MFP 100 side.

The application A acquires all setting information in the system, for example. The application B acquires information of an address book, for example. The application C acquires document information, for example. The application D acquires user list information, for example. The application E acquires counter information, for example. The counter information is used, for example, upon replacement of MFP 100, for restoring the charging counter of the pre-replacement MFP 100 when the MFP 100 is replaced with one. It is to be noted that the applications A to E are not limited to the descriptions here but are available for acquiring setting information such as a function by an optional device attached to the MFP 100 or a customized function related to printing etc.

In addition, as shown in FIG. 2B, the applications A to E include application identification information, backup target information, destination address information, and the like. The application identification information includes an identification number and the like. The backup target information includes, for example, information indicating backup specific data for backup. The destination address information includes address information (for example, http://aaa/bbb) of the data backup servers 400A to 400C to which the acquired backup specific data is transmitted. In such way, including the address information (for example, http://aaa/bbb) of the data backup servers 400A to 400C as the transmission destinations in the applications A to E, the MFP 100 side can recognize the destination of the backup specific data acquired Setting becomes unnecessary. On the side of the administrator managing the cloud server 200 and the data backup servers 400A to 400C, the backup specific data from the side of MFP 100 can be managed by any of the data backup servers 400A to 400C set in advance, which allows the MFP 100 to manage and maintenance in an easy way.

The communication control section 201 receives transmission requests for the applications A to E from the MFP 100. In response to the transmission request from the MFP 100, the system control section 202 transmits the applications A to E stored in the storage device 203.

The data backup servers 400A to 400C, as shown in FIG. 3, have a communication control section 401, a system control section 402, and a storage device 403. The storage device 403 stores the backup information a1 to a3 acquired from the side of the MFP 100 side. The backup information a1 to a3 include device unique information for identifying the MFP 100 and backup specific data having identification information. It is to be noted that when storing the backup information a1 to a3 in the storage device 403, it may be possible store the acquisition date and time of the backup information a1 to a3 from the MFP 100 on the side of the data backup servers 400A to 400C.

The communication control section 401 acquires the backup information a1 to a3 from the MFP 100. The system control section 202 causes the storage device 403 to store the backup information a1 to a3 acquired by the communication control section 401.

The MFP 100 includes, as shown in FIG. 1, a control section 110 that controls operations of a scanner section 101, a printer section 102, a fax section 103, an I/F 104, a panel section 105, and a HDD 106.

The scanner section 101 is a device that converts an image of a document read by an image sensor into digital image data and inputs the digital image data to the control section 110. The printer section 102 is a device that prints an image on paper based on print data output from the control section 110. The fax section 103 is a device that transmits data output from the control section 110 to its opposite-side facsimile equipment via a telephone line, and receives data from mating facsimile equipment and received data the data to the control section 110.

The I/F 104 is connected, via a network 300, to the cloud server 200 and the data backup servers 400A to 400C. It is to be noted that the I/F 104 may be available for communication with other MFPs, user terminals and the like, or may be available for communication with a content server, a web server and the like. The panel section 105 is a device of the MFP 100 which includes a touch panel that performs the print function, the copying function, the FAX function of the MFP 100, a data transmitting/receiving function via the network 300, and a display for various settings. The HDD 106 is a storage device that stores application programs and the like for providing various functions of the MFP 100. The HDD 106 also has a user box for storing print jobs registered from the user terminal side and print correspondence data in the page description language, for example.

The control section 110 is a processor that controls the overall operation of the MFP 100 by executing an application program such as an authentication program, an image forming program, a control program, and the like. The control section 110 includes a scanner control section 111, a printer control section 112, a FAX control section 113, a communication control section 114, a RAM 115, an EEPROM 116, a backup data acquisition section 117, a data restoration section 118, an image process section 119, a panel operation control section 120, an HDD control section 121, and a system control section 122. In addition, these are connected to a data bus 123.

The scanner control section 111 controls the reading operation of the scanner section 101. The printer control section 112 controls the printing operation of the printer section 102. The FAX control section 113 controls the data transmission/reception operation by the FAX section 103. The communication control section 114 controls, for example, transmission and reception of data via the I/F 104 connected to the network 300.

The RAM 115 is used as a work memory when executing a program. In addition, the RAM 115 stores print data subjected to image process by the image process section 119. In the EEPROM 116, there is stored a control program for checking the operation of each section and the like. Further, in the EEPROM, stored are a firmware for operating the scanner section 101, the printer section 102, the FAX section 103, the I/F 104, the panel section 105, the HDD 106, and the like. The firmware may incorporate an application for backing up basic setting information relating to the basic functions of the MFP 100, such as the printing function, the copying function, the FAX function, the data transmitting/receiving function via the network, and the like The backup data acquisition section 117 manages the application acquisition setting information 117a shown in FIG. 4A. The application acquisition setting information 117a includes setting contents of data backup and includes information indicated by settings 1 to 3 received by the panel operation control section 120 via the panel section 105. Setting 1 indicates address information (for example, http://xxx/yyy) of, for example, the cloud server 200 that is the acquisition destination of the applications A to E. Setting 2 indicates acquisition timings (for example, 13:00 every day) of the applications A to E. Setting 3 indicates, for example, applications A, D, and E to be acquired. When setting the applications A, D, and E to be acquired, application identification information is available such as an application name and an identification number assigned to each of the applications A, D, and E.

In addition, the address information of setting 1 (for example, http://xxx/yyy) can be changed in an arbitrary manner. More specifically, when there are a plurality of cloud servers 200 as the acquisition destinations of the applications A to E, it is possible to set address information of an arbitral one of the cloud servers 200. In addition, the address information in the setting 1 may be arbitrarily set for each of the applications A, D, and E acquired in the setting 3. Further, it is possible to arbitrarily change the setting timing of setting 2 (for example, 13:00 every day). Also, applications A, D, E to be acquired in setting 3 can be changed arbitrarily.

In addition, the backup data acquisition section 117 executes the applications A to E that are downloaded from the cloud server 200 pursuant to an instruction of the system control section 122, and acquires backup specific data of the MFP 100.

Pursuant to an instruction from the system control section 122, the data restoring section 118 executes the applications A to E that are downloaded from the cloud server 200, and restores the backup specific data that are downloaded from the data backup servers 400A to 400C. Further, the data restoring section 118 manages the application acquisition setting information 117b shown in FIG. 4B. The application acquisition setting information 117b includes information shown in settings 1 to 3, for example, received by the panel operation control section 120 via the panel section 105. The setting 1 indicates address information (for example, http://xxx//yyy) of, for example, the cloud server 200 that is the acquisition destination of the applications A to E. The setting 2 indicates the acquisition timing of the applications A to E (for example, when requested by the administrator). The setting 3 indicates, for example, application A to be acquired. When setting the application A to be acquired, application identification information may be available such as an application name and an identification number assigned for the application A can be used.

In addition, the address information of the setting 1 (for example, http://xxx//yyy) can be changed arbitrarily in setting as described above. Further, it is possible to arbitrarily change the setting timing of the setting 2 (for example, at the time of request by the administrator, and arbitrarily change setting of the application A to be acquired in setting 3. Also, the data restoration section 118 performs, pursuant to an instruction from the system control section 122 executes, for example, the application A downloaded from the cloud server 200, downloads backup specific data from the data backup servers 400A to 400C, and executes data restoration.

The image process section 119 renders the image data read by the scanner section 101 in image process. Further, the image process section 119 renders the print target data registered in the user box of the HDD 106 in image process. It is to be noted that that the system control section 122 temporarily stores the print data has been undergone the image process at the image process section 119 in the RAM 115.

The panel operation control section 120 controls a display operation of the panel section 105. The panel operation control section 120 also accepts the start of printing, copying, FAX, data transmission/reception via the network 300 and the like via the panel section 105. In addition, the panel operation control section 120 receives, via the panel section 105, setting information including for example the aforementioned settings 1 to 3.

The system control section 122 controls a cooperative operation between each of the sections and the like. Further, when the copying function, the printing function or the like is selected via the panel section 105, the system control section 122 controls the scanner section 101 and the printer section 102 to read and print the document, via the scanner control section 111 and the printer control section 112, respectively. Further, when the setting of the application acquisition setting information 117a or the application acquisition setting information 117b is instructed via the panel section 105, the system control section 122 instructs the panel operation control section 120 to change the settings via the panel section 105.

In addition, the system control section 122 monitors the application acquisition setting information 117a managed by the backup data acquisition section 117, and when the acquisition timing (for example, 13:00 every day) of the setting 2 comes, the system control section 122, to the cloud server 200 corresponding to the setting 1, issues a transmission request of, for example, applications A, D, E to be acquired in the setting 3. Also, upon receipt of a data restoration request from the administrator, the system control section 122 refers to the application acquisition setting information 117b managed by the data restoring section 118, and instructs the cloud server 200 corresponding to the address information of setting 1, for example, issues a transmission request for application A to be acquired in the setting 3, and instructs data restoration section 118 to restore data.

In addition, the system control section 122 causes the HDD 106 to store temporarily the applications A to E that are downloaded from the cloud server 200. It is to be noted that instead the system control section 122 may cause the EEPROM 116 to store the applications A to E that are downloaded from the cloud server 200. Also, the system control section 122 instructs the backup data acquisition section 117 to acquire backup specific data of the MFP 100 based on the applications A to E that are downloaded from the cloud server 200. In addition, the system control section 122 instructs the communication control section 114 to transmit to the data backup servers 400A to 400C corresponding to the address information (for example, http://aaa//bbb) of the transmission destination included in the applications A to E and instructs transmission of backup specific data. In this case, the system control section 122 instructs the communication control section 114 to include the device specific information in the backup specific data.

Further, upon receipt of a data restoration request from the administrator, the system control section 122 temporarily stores the application A downloaded from the cloud server 200 in the HDD 106. It is to be noted that the system control section 122 may store the application A downloaded from the cloud server 200, for example, in the EEPROM 116. Further, the system control section 122 instructs the communication control section 114 to back up to the data backup servers 400A to 400C corresponding to the address information (for example, http://aaa/bbb) of the transmission destination included in the application A And instructs a request to download specific data. In this case, the system control section 122 instructs the communication control section 114 to include the identification information of the backup specific data in the download request. Further, the system control section 122 instructs the data restoration section 118 to restore the data of the backup specific data downloaded from the cloud server 200.

It is to be noted that as to downloading the applications A to E from the cloud server 200, for example, the applications A, D and E set in the setting 3 may be executed at once, however the applications A, D, E may be sequentially executed for downloading when considering area of the HDD 106 which is to be used for storing the applications A, D and E that are downloaded. More specifically, for example, the system control section 122 temporarily stores the downloaded application A in the HDD 106, and when the backup data obtaining section 117 obtains all the setting information in the system, for example, based on the application A, all the acquired information in the system, to the data backup servers 400A to 400C corresponding to the address information (for example, http://aaa/bbb), and deletes the application A stored in the HDD. Subsequently, when the system control section 122 downloads the application D and the backup data acquisition section 117 acquires, for example, user list information based on the application D, for example, the backup information a 2 including the acquired user list information is converted into address information http://aaa/bbb), and deletes the application D stored in the HDD 106. Thereafter, the system control section 122 executes similar process for the application E, so that the applications A, D, and E to be downloaded can be set one by one, and the use area of the HDD 106 can be reduced.

Figure 5:
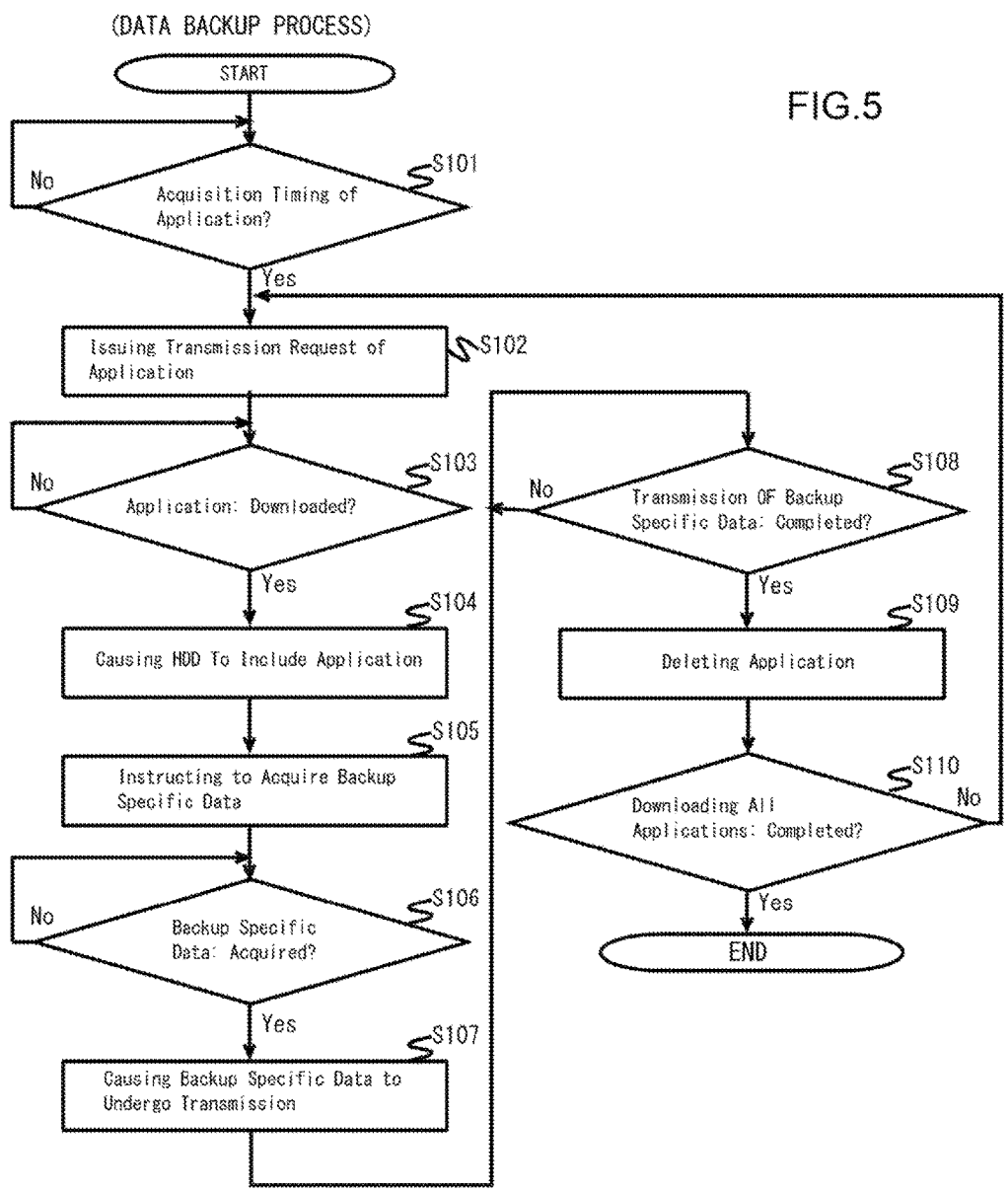
FIG. 5 shows steps of data backup process on the MFP side in FIG. 1.

Next, with reference to FIG. 5, the data backup process will be described. In the following description, it is assumed that applications A, D, and E are to be downloaded in a sequential manner based on the application acquisition setting information 117a shown in FIG. 4A.

(Step S101)

The system control section 122 determines whether it is the acquisition timing of the applications A, D, E or not.

In this case, the system control section 122 monitors the application acquisition setting information 117a managed by the backup data acquisition section 117 to determine that it is not the acquisition timing of the applications A, D, E unless the acquisition timing (for example, every day 13:00) comes (Step S101: No).

On the other hand, the system control section 122 monitors the application acquisition setting information 117a managed by the backup data acquisition section 117 to determine that it is the acquisition timing of the applications A, D, E if the acquisition timing (for example, every day 13:00) comes (Step S101: Yes). It is to be noted that that the system control section 122 can determine whether it is acquisition timing (for example, 13:00 every day) by comparing with the time of the clock function installed in the MFP 100.

(Step S102)

The system control section 122 issues the transmission requests for the applications A, D, and E.

In this case, the system control section 122 issues the transmission request for the application A, via the communication control section 114, to the cloud 200 based on the applications A, D, and E included in the application acquisition setting information 117a managed by the backup data acquisition section 117 and the address information of the acquisition destinations (for example, http://xxx//yyy) of the applications A, D, and E.

At this time, upon receipt of the transmission request of the application A from the MFP 100 via the communication control section 201, the system control section 202 of the cloud server 200 transmits the application A stored in the storage device 203 to the MFP 100.

Further, the system control section 122 downloads the application A transmitted based on the transmission request from the cloud server 200.

(Step S103)

The system control section 122 determines whether or not the application A has been downloaded.

In this case, if there is no notification indicating the completion of the downloading of the application A from the communication control section 114, the system control section 122 determines that the application A has not been downloaded (step S103: No).

On the other hand, if there is a notification indicating the completion of the downloading of the application A from the communication control section 114, the system control section 122 determines that the application A has been downloaded (step S103: Yes), and the control goes to step S104.

(Step S104)

The system control section 122 causes the HDD 106 to store the application A. It is to be noted that the downloaded application A may be stored in the EEPROM 116 as described above.

(Step S105)

The system control section 122 instructs acquisition of backup specific data.

In this case, the system control section 122, after causing the HDD 106 to store the application A, instructs the backup data acquiring section 117 to acquire the backup specific data of the MFP 100 based on the application A.

At this time, the backup data acquisition section 117 executes the application A stored in the HDD 106, and acquires for example all the setting information in the system as the backup specific data.

(Step S106)

The system control section 122 determines whether or not the backup specific data has been acquired.

In this case, when there is no notification indicating the completion of acquisition of all the setting information in the system, which is the backup specific data from the backup data obtaining section 117, the system control section 122 determines that the backup specific data has not been acquired (Step S106: No).

On the other hand, if there is a notification indicating completion of acquisition of all the setting information in the system, which is the backup specific data from the backup data obtaining section 117, the system control section 122 determines that the backup specifying data has been acquired (Step S106: Yes), and the control goes to step S107.

(Step S107)

The system control section 122 causes the backup information a1 to a3 to undergo being transmitted.

In this case, the system control section 122 instructs the communication control section 114, based on the address information (for example, http://aaa//bbb) included in the application A and serving as the transmission destination of the backup information a1 for example, backup information a1 including all the setting information in the system and the device specific information, which is backup specific data acquired by the backup data obtaining section 117, to the data backup servers 400A to 400C.

At this time, the system control section 202 of the corresponding data backup server 400A to 400C adds the acquisition date and time to the backup information a1 acquired by the communication control section 401, and stores it in the storage device 403.

(Step S108)

The system control section 122 determines whether or not the transmission of the backup informational to a3 has been completed. In this case, if there is no notification indicating the completion of the transmission of the backup information a1 from the communication control section 114, the system control section 122 determines that the transmission of the backup information a1 has not been completed (step S108: No).

On the other hand, if there is a notification indicating the completion of the transmission of the backup information a1 from the communication control section 114, the system control section 122 determines that the transmission of the backup information a1 has completed (step S108: Yes), and the control goes to the step S109.

(Step S109)

The system control section 122 deletes the application A. In this case, the system control section 122 deletes the application A stored in the HDD 106.

(Step S110)

The system control section 122 determines whether or not downloading of all the applications A, D, and E has been completed. In this case, if all the applications A, D, and E to be acquired which are included in the application acquisition setting information 117a have been downloaded, the system control section 122 determines that the downloading of all the applications A, D, and E has been completed (Step S110: Yes), and the control terminates.

On the other hand, unless all the applications A, D, and E to be acquired which are included in the application acquisition setting information 117a have been downloaded, the system control section 122 determines that the downloading of all the applications A, D, and E has been completed (Step S110: No), and the control goes to step S102.

Thereafter, the system control section 122 executes the processes of steps S102 to S109 for the applications D and E in a sequential manner subsequent to the application A. More specifically, in step S102, the system control section 122 issues a transmission request for the application D to the cloud server 200 via the communication control section based on the application D to be acquired which is included in the application acquisition setting data 117a and address information (for example, http://xxx/yyy) of the acquisition destination of the application D.

In addition, the system control section 122 causes, in step S104, the HDD 106 to store the application D downloaded from the cloud server 200, and instructs, in step S105, the backup data obtaining section 117 to acquire, for example, user list information that is the backup specific data of the MFP 100 based on the application D downloaded from the cloud server 200.

Further, in step S108, when the transmission of, for example, the backup information a2 including the user list information based on the application D is completed, the system control section 122 deletes the application D stored in the HDD 106 in step S109. Upon proceeding to step S102, the system control section 122 issues a transmission request for the application D to the cloud server 200 via the communication control section based on the application D to be acquired which is included in the application acquisition setting data 117a and address information (for example, http://xxx/yyy) of the acquisition destination of the application E.

Also, in step S104, the system control section 122 causes the HDD 106 to store the application E downloaded from the cloud server 200 and in step S105 instructs the backup data obtaining section 117 to acquire, for example, counter information that is the backup specific data of the MFP 100 based on the application E downloaded from the cloud server 200.

Further, upon completion of the transmission of, for example, backup information a3 including the counter information based on the application E, in step S108, the system control section 122 deletes the application E stored in the HDD 106 in step S109. Then, if the system control section 122 determines that the downloading of all the applications A, D, and E has been completed in step S110, the system control section 122 terminates the procedure.

It is to be noted that the aforementioned procedure is provided for explaining the case of the sequential download of the applications A, D, and E, based on the application acquisition setting information 117a, however, it may be possible to download the applications A, D, and E at a time to store in the HDD 106, to acquire backup specific data based on all the Applications A, D, and E, and to delete all the applications A, D, and E that has been rendered to store in the HDD 106 upon completion of transmitting the backup information a1 to a3 in which all the backup specific information is included.

Figure 6:
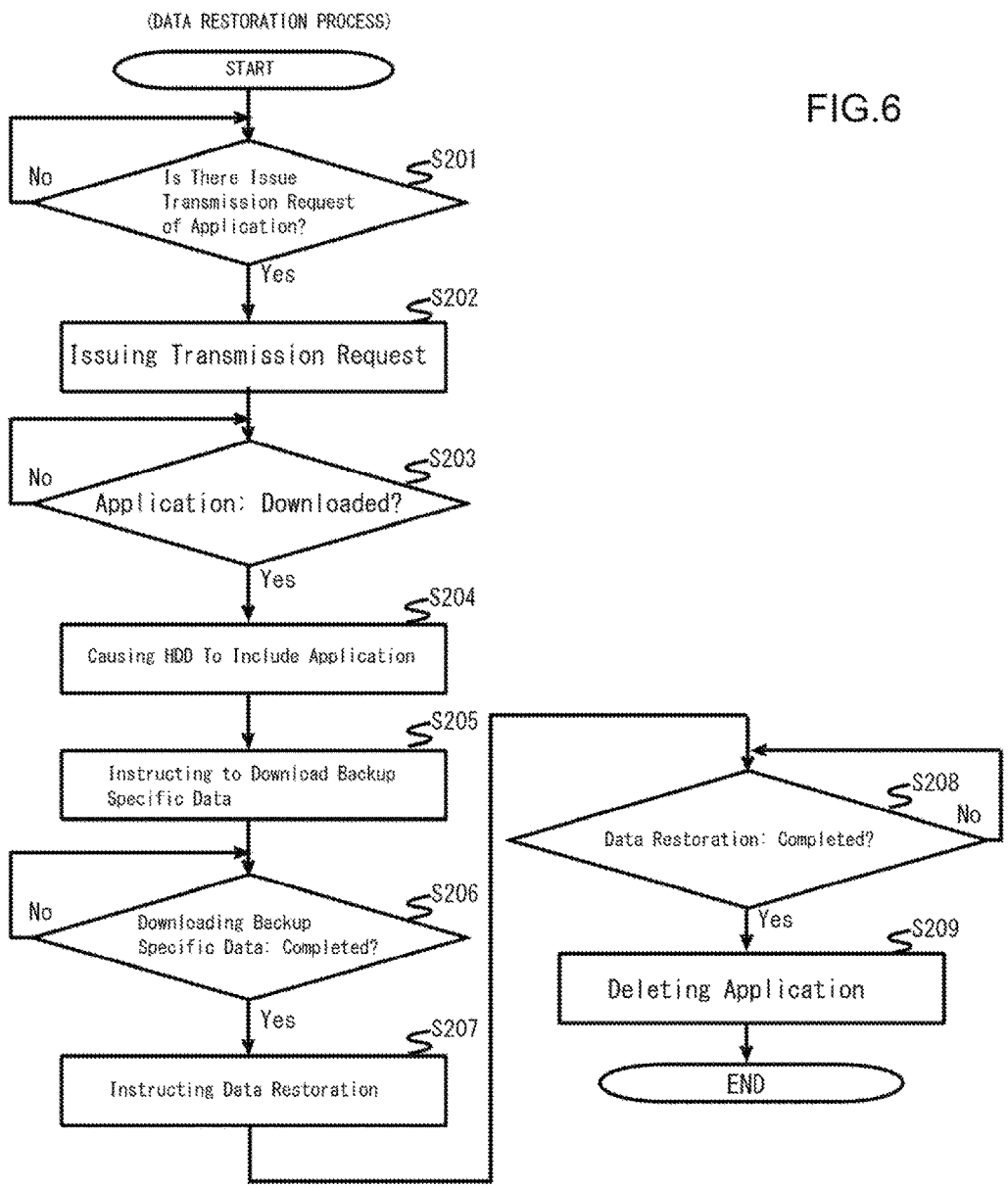
FIG. 6 shows the steps of data restoration process on the MFP side in FIG. 1.

Next, with reference to FIG. 6, a data restoration procedure will be described. It is to be noted that the following description is made on the assumption that, for example, application A is downloaded based on application acquisition setting information 117b shown in FIG. 4B.

(Step S201)

The system control section 122 determines whether or not there is an acquisition request of the application A. In this case, if there is no notification indicating that the acquisition request of the application A has been accepted via the panel section 105 from the panel operation control section 120, the system control section 122 determines that there is no acquisition request of the application A (step S201: No).

On the other hand, if there is a notification indicating that the acquisition request of the application A has been accepted via the panel section 105 from the panel operation control section 120, the system control section 122 determines that there is an acquisition request of the application A (Step S201: Yes), and the control goes to step S202.

(Step S202)

The system control section 122 issues a transmission request of the application A.

In this case, the system control section 122 transmits, via the communication control section 114, a transmission request of the application A to the cloud server 200 based on the application A to be acquired which is included in the application acquisition setting information 117b managed by the data restoration section 118 and the address information (for example, http://xxx//yyy) of the acquisition destination of the application A.

At this time, the system control section 202 at the side of the cloud server 200 transmits, upon receipt of the transmission request of the application A from the MFP 100 via the communication control section 201, the application A stored in the storage device 203 to the MFP 100.

Further, the system control section 122 downloads the application A based on the transmission request from the cloud server 200.

(Step S203)

The system control section 122 determines whether or not the application A has been downloaded.

In this case, if there is no notification indicating the completion of the downloading of the application A from the communication control section 114, the system control section 122 determines that the application A has not been downloaded (step S203: No).

On the other hand, if there is a notification indicating the completion of the downloading of the application A from the communication control section 114, the system control section 122 determines that the application A has been downloaded (step S203: Yes), and the control goes to step S204.

(Step S204)

The system control section 122 causes the HDD 106 to store the application A. It is to be noted that as described above the downloaded application A may be stored in the EEPROM 116.

(Step S205)

The system control section 122 issues a request of downloading the backup specific data.

In this case, based on, for example, address information (for example, http://aaa//bbb) of the backup information including the backup specific data in the application A, the system control section 122 issues a request of downloading for example all setting information in the system which is the backup specific data to the data backup servers 400A to 400C corresponding to the address information via the communication control section 114.

(Step S206)

The system control section 122 determines whether or not the downloading has been completed.

In this case, if there is no notification indicating the completion of the download of the backup specific data from the communication control section 114, the system control section 122 determines that the download of the backup specific data has not been completed (step S206: No).

On the other hand, if there is a notification indicating the completion of the download of the backup specific data from the communication control section 114, the system control section 122 determines that the download of the backup specific data has been completed (step S206: Yes), and the control goes to step S207.

(Step S207)

The system control section 122 makes an instruction of a data restoration.

In this case, the system control section 122 instructs the data restoration section 118 to make a data restoration.

At this time, the data restoring section 118 executes the application A to restore, for example, all setting information in the system which is the downloaded backup specific data.

(Step S208)

The system control section 122 determines whether or not the data restoration has been completed.

In this case, if there is no notification indicating that the data restoration from the data restoration section 118 has been completed, the system control section 122 determines that the data restoration has not been completed (step S208: No).

On the other hand, if there is a notification indicating that the data restoration from the data restoration section 118 has been completed, the system control section 122 determines that the data restoration has been completed (step S208: Yes), and the control goes to step S209.

(Step S209)

The system control section 122 deletes the application A. In this case, the system control section 122 deletes the application A that has been rendered to be stored in the HDD 106.

It is to be noted that if the applications D and/or E are also set to be acquired other than the application A, similar to the aforementioned description, processes of steps S202 to S209 are executed. In detail, in step S202, the system control section 122 issues a transmission request to the cloud server 200 via the communication control section 144, based on the application D to be acquired which is included in the application setting information 117b and address information (for example, http://xxx/yyy) of an acquisition destination of the application D.

In addition, in step S204, the system control section 122 causes the HDD 106 to store the application D downloaded from the cloud server 200, and requests downloading of, for example, backup specification data of user list information in step S205.

In addition, if the data restoring section 118 completes the data restoration of, for example, the user list information in step S208, the system control section 122 deletes the application D that has been caused to be stored in the HDD 106. Also, the system control section 122, in step S202, issues a transmission request to the cloud server 200 via the communication control section 144, based on the application E to be acquired which is included in the application setting information 117b and address information (for example, http://xxx//yyy) of an acquisition destination of the application E.

Further, in step S204, the system control section 122 causes the HDD 106 to store the application E downloaded from the cloud server 200 and in step S205 requests download of, for example, backup specific data of the counter information. Also, when the data restoring section 118 completes the data restoration of, for example, the counter information in step S208, the system control section 122 deletes the application E that has been caused to be stored in the HDD 106.

It is to be noted that regarding the applications D and E, similar to the aforementioned description, the applications D and E may be downloaded in a sequential manner, and it may be possible to download concurrently the applications A, D, and E, to cause the resulting applications A, D, and E to be stored in the HDD 106 and to delete the stored applications A, D, and E in the HDD 106 after the data restoration section 118 completes a data restoration based the applications A, D, and E.

In such away, the operation of the present embodiment can be summarized as follows: The system control section downloads, from the cloud server (application providing server), applications A to E each which has a backup procedure of backup specific data (specific data) and a data restoration procedure of the backup specific data (specific data) based on either one of the backup procedure and the data restoration procedure. Then, the HDD 106 (storage device) undergoes to store the downloaded applications A to E and the backup data acquisition section 117 (data acquisition section) undergoes to execute the applications A to E to acquire the backup specific data (specific data). In addition, using the data restoration section 118, the applications A to E are executed to restore the backup specific data (specific data). Also, the system control section 122 transmits, during the backup procedure, the backup specific data (specific data) acquired by the backup data acquisition section 117 (data acquisition section) to the data backup servers 400A to 400C. Then, after transmission of the backup specific data (specific data), the system control section 122 deletes the applications A to E that has been caused to be stored in the HDD 106 (storage device). Further, during the data restoration procedure, the system control section 122 downloads the backup specific data (specific data) from the backup server 400A to 400C to make an instruction that causes the data restoration section 118 to perform data restoration using the downloaded backup specific data (specific data). Then, after the data restoration section 118 completes the data restoration, the system control section 122 deletes the applications A to E stored in the HDD 106 (storage device).

Thereby, causing the backup data acquisition section 117 (data acquisition section) to execute the applications A to E downloaded from the cloud server 200 (application providing server) makes it possible to upload only the backup specific data (specific data) to the data backup servers 400A to 400C without having to reform the firmware. In addition, executing the applications A to E that the data restoration section 118 downloads from the cloud server 200 (application providing server) makes it possible to restore the backup specific data (specific data) downloaded from the data backup servers 400A to 400C without having to reform the firmware. As a result, it is possible to perform backup by uploading the backup specific data (specific data) and the data restoration by downloading the backup specific data (specific data) without requiring re-creation of a firmware.

It is to be noted that the present embodiment has been described as to the case where the electronic apparatus is applied in the form of the MFP 100, however, the electronic device is not limited thereto and therefor is applicable in other forms that include, for example, an image forming device such as a multifunction printer or the like, a PC that needs a backup process and data restoration process, a portable terminal, and a tablet terminal.

In the method of transmitting the status information in the above-described typical example, when the image forming device side is in operation, the agent section can transmit the status information to the remote maintenance server based on both the transmission schedule information and the operation schedule information.

In this connection, it is conceivable that applying the method of transmitting the status information in the typical example to the above-described data backup procedure results in that there is no need of mounting a large capacity storage device, even if the amount of data in the backup process is enormous.

However, taking a backup of only specific data into a server by uploading compels the firmware to incorporate, for example, a specific data acquisition procedure and a procedure of uploading the specific data to the server. In such a case, reforming the firmware is an essential measure.

In addition, for restoring only the specific data uploaded to the server, it is necessary for the firmware to incorporate a procedure of downloading only the specific data and a procedure of restoring only the downloaded specific data. In such a case, reforming the firmware is an essential measure, too.

In light of the aforementioned circumstances, there is a need for a device that can perform a backup operation of specific data by uploading and a data restore operation by downloading only the specific data.

In the electronic device and application control program according to the present disclosure, the system control section downloads, from the application providing server, applications A to E each which has a backup procedure of specific data and a data restoration procedure of the specific data based on either one of the backup procedure and the data restoration procedure. Then, the storage device undergoes to store the downloaded applications A to E and the data acquisition section undergoes to execute the applications to acquire the specific data. In addition, using the data restoration section, the applications A to E are executed to restore the specific data. Also, the system control section transmits, during the backup procedure, the specific data acquired by the data acquisition section to the data backup servers. Then, after transmission of the specific data, the system control section deletes the applications that has been caused to be stored in the storage device. Further, during the data restoration procedure, the system control section downloads the specific data from the backup server to make an instruction that causes the data restoration section to perform data restoration using the specific data. Then, after the data restoration section completes the data restoration, the system control section deletes the applications A to E stored in the storage device.

Thereby, executing the application that data acquiring section has downloaded from the application providing server makes it possible to upload only the specific data to the backup server without having to create a new firmware. In addition, executing the application that the data restoring section has downloaded from the application providing server makes it possible to restore the specific data downloaded from the backup server without having to create a new firmware.

The electronic device and application control program according to the present disclosure will make it possible to perform a backup operation of a specific data by uploading and a data restore operation by downloading the specific data without having to create a new firmware.

What is claimed is:

1. An electronic device, comprising:
a system control section that downloads, from an application providing server, one or more applications each having a respective backup procedure of respective specific data and a respective data restoration procedure of the respective specific data based on either one of the respective backup procedure and the respective data restoration procedure;
a storage device that stores the downloaded the one or more applications;
a data acquisition section that executes the stored one or more applications to acquire the respective specific data; and
a data restoration section that executes the stored one or more applications to restore the respective specific data,
wherein
the data acquisition section manages identification information of the one or more applications to be downloaded, address information indicating an acquisition destination of each of the one or more applications to be downloaded, and one or more pieces of application acquisition setting information having acquisition timing of the one or more applications to be downloaded,
the system control section monitors each of the one or more pieces of application acquisition setting information, and when the acquisition timing of a respective one or more applications of the one or more applications comes, the system control section issues a transmission request to the application providing server for the respective one or more applications based on the identification information of the respective one or more applications and downloads the respective one or more applications from the application providing server via a transmission provided by the application providing server as a response to the transmission request, the data acquisition section executes, during the respective backup procedures, the respective one or more applications transmitted in response to the transmission request, and acquires the respective specific data corresponding to the respective one or more applications transmitted in response to the transmission request, the system control section transmits, during the respective backup procedures, the respective specific data acquired by the data actuation section to a backup server and deletes the respective application stored in the storage device after the transmission of the respective specific data, and the system control section downloads, during the respective data restoration procedures, the respective specific data from the backup server, instructs the data restoration section to restore the downloaded respective specific data, and deletes the respective application after the data restoration section completes the restoration of the respective specific data.

2. A non-transitory computer-readable recording medium that stores an application control program that is executable by a computer, the application control program being configured to cause the computer to operate a system control section, a storage section, a data acquisition section, and a data restoration section in the following ways that include:

causing the data acquisition section to manage identification information of one or more applications to be downloaded, address information indicating an acquisition destination of each of the one or more applications to be downloaded, and one or more pieces of application acquisition setting information having acquisition timing of the one or more applications to be downloaded, causing the system control section to monitor each of the one or more pieces of application acquisition setting information, and when the acquisition timing of a respective one or more applications of the one or more applications comes, causing the system control section to issue a transmission request to the application providing server for the respective one or more applications based on the identification information of the respective one or more applications and download the respective one or more applications from an application providing server via a transmission provided by the application providing server as a response to the transmission request, wherein each of the one or more applications have a respective backup procedure of respective specific data and a respective data procedure of the respective specific data based on either one of the respective backup process and the respective data restoration procedure, causing the storage section to store the downloaded respective one or more applications, causing the data acquisition section to execute the stored respective one or more applications to acquire the respective specific data, causing the data restoration section to execute the stored respective one or more applications to restore the respective specific data, causing the system control section to execute, during the respective backup procedures, the respective one or more applications transmitted in response to the transmission request, and acquire the respective specific data corresponding to the respective one or more applications transmitted in response to the transmission request, causing the system control section, during the respective backup procedure, to transmit the respective specific data acquired by the data actuation section to a backup server and to delete the respective application stored in the storage device after the transmission of the respective specific data, and causing the system control section, during the respective data restoration procedures, to download the respective specific data from the backup server, to instruct the data restoration section to restore the respective specific data, and to delete the respective application after the data restoration section completes the restoration of the respective specific data.

* * * * *